Patented Dec. 5, 1944

2,364,158

UNITED STATES PATENT OFFICE 2,364,158

RUBBER DERIVATIVES PRODUCTS

James A. Mitchell, Kenmore, N. Y., assignor to E. I. du Pont de Nemours & Company, Wilmington, Del., a corporation of Delaware No Drawing. Application September 16, 1941,
Serial No. 411,039

10 Claims. (Cl. 260—768)

This invention relates to moisture-resistant sheet wrapping material, especially transparent, moistureproofed, non-fibrous sheet. More particularly it appertains to non-tacky, heat-sealable, age-resistant moistureproofing coatings on films of regenerated cellulose and the like.

One of the newer sheet wrapping materials consists of a thin, cellulosic base sheet having a moistureproofing coating. The manufacture of typical base sheet (film, foil, pellicle, skin, tissue, web) is described in U. S. A. Patents 1,548,864 (Brandenberger) and 2,123,883 (Ellsworth). Representative coating compositions and the application thereof, are set out in U. S. A. Patents 1,737,187 (Charch & Prindle), 1,826,697-8 (Charch & Craigue), 2,042,589 (Charch & Hershberger), 2,147,180 (Ubben), 2,159,151 (Hershberger), 2,169,366 (Meigs) and 2,201,747 (Staudt).

The coating is usually a continuous, unbroken layer comprising essentially moistureproofing material (material which does not dissolve more than an infinitesimal amount of, if any water), for example, a waxy substance such as paraffin wax, a cementing (binding, film-forming) material therefor, for example, cellulose nitrate. Generally the base film contains softening material, for example, glycerol, and the coating contains plasticizing material, for example, dibutyl phthalate, to promote flexibility.

To overcome any haziness which might result from some proportions and combinations of other components of the coating, transparentizing (blending, homogenizing) material, for example, resins and gums such as damar and ester gum, is ordinarily included.

When rubber is worked on a rubber mill (or related apparatus, such as a Banbury mixer) with about 5% to 55% its weight of beta-naphthol (or similar monohydric phenol) in the presence of a small amount of a special catalyst, for example, di-hydroxy-fluoroboric acid or sulfuric acid, for about 15 minutes at 100° C., a material (for convenience called "Phenol rubber product 2,158,530," or more simply, "phenol rubber product") is obtained which is quite unlike rubber and the heretofore known rubber derivatives (including the products known as rubber isomers). The new material, being denser, sinks when placed in water, will not adhere to rubber, is more soluble in hydrocarbon solvents than cyclized rubber (J. I. E. C. XXXIII, 389), and when mixed with rubber on a mill and the mixture made into a thin cement, layers off. The material seems to be an alkylated phenol (rubber being the alkylating agent), since the phenol molecule seems to have chemically combined with the rubber molecule (probably at what was an unsaturated carbon atom in ordinary rubber), the reaction product according to U. S. P. 2,158,530 containing 1 to 5% of chemically combined phenol.

Surprisingly, it has now been found that this material can be reacted with maleic anhydride and related carbonyl compounds containing or yielding derivatives containing the grouping —CO—C=C— (for example, itaconic acid and citric acid). The resulting resinous materials can be used very satisfactorily in the preparation of moistureproofing coatings.

It was an object of this invention to provide improved coating compositions. Other objects were to produce improved moistureproofing coating compositions, improved moistureproofing coatings and improved moistureproof sheet wrapping material. Further objects were to produce improved moisture-resistant, non-fibrous pellicles, to produce satisfactory coating compositions comprising phenol-rubber-product derivatives, to produce coating compositions which would adhere firmly to a flexible base sheet even when subjected to moisture and/or water for long periods of time, to produce phenol-rubber-product derivative compositions which would be stable over long periods of time, to produce coating compositions exhibiting high stability, to produce moisture-resistant coating compositions comprising phenol-rubber-product derivatives, moistureproofing agents and conventional constituents, to provide transparent, non-fibrous, moistureproof, regenerated cellulose and like sheet wrapping materials comprising stable phenol-rubber-product derivative compositions, to produce coating compositions which give adhesive bonds of strength satisfactory for laminating thin, flexible, non-fibrous sheet materials, to produce coating compositions which would remain stable when exposed to high temperatures, heat, and the like for long periods of time, and to produce coating compositions which would give adhesive bonds of good strength on the application of heat and pressure. A general advance in the art, and other objects which will appear hereinafter, are also contemplated.

It has now been found that compositions prepared from carbonyl compound derivatives from phenol-rubber products, for example, moistureproofing coatings, have excellent heat sealability, give adhesive bonds which are initially very good and remain so for long periods of time, and are stable and transparent after long exposure to light, high temperatures, etc.

How the foregoing objects and related ends are accomplished will be apparent from the following exposition, in which are disclosed the principle and divers embodiments of the invention, including the best mode contemplated for carrying out the same. Parts are given by weight unless otherwise specified.

Example I

Prepare a 450 gauge web of regenerated cellulose in the manner described in U. S. A. Patent No. 1,548,864 (Brandenberger), that is, by casting viscose, coagulating, regenerating, desulfuring, bleaching, washing free from impurities, softening and drying. Use an aqueous bath containing 4.33% glycerol for softening, use rollers heated to 60°–90° C. for drying, and bring the dried sheet to normal humidity.

Heat a solution of:

| | Parts |
|---|---|
| Beta-naphthol-rubber product (purified [1]) | 25.0 |
| Cinnamic acid | 3.0 |
| Benzoyl peroxide | 0.25 |
| Toluene | 225.0 |

[1] Excess (unreacted) beta-naphthol removed, under a reflux condenser at approximately 115° C. for five hours, and then incorporate 2.5 parts of paraffin wax (M. P. 60° C.).

Coat the regenerated cellulose web with the resulting composition. Carry out the coating of the web by passing it continuously through a bath of the aforementioned solution maintained at 35° C. Remove the excess coating material by scraping with doctor knives, and dry the coated web (remove the volatile solvent) at a temperature slightly above the melting point of the wax.

Employ enough of the moistureproofing coating composition so that the final product will have an amount proportional to two pounds for each 3,000 square feet of web surface (this quantity to include the coating on both sides of the web).

The resulting product will be moistureproof (have a permeability value of 25), heat sealable (have a heat sealing value of 240), transparent, flexible, colorless, and quite non-tacky. The coating will show no loss in adhesion and heat sealing characteristics after several weeks' exposure at 95° F. (35° C.).

A product prepared in exactly the same manner, but omitting the refluxing step in the preparation of the moistureproofing coating composition, will lose its adhesion (if sealed) or heat sealing (if unsealed) properties in one week.

Example II

Prepare a moistureproofing coating composition by heating:

| | Parts |
|---|---|
| Beta-naphthol-rubber product (purified) | 25.0 |
| Itaconic acid | 2.5 |
| Benzoyl peroxide | 0.25 |
| Toluene | 225.0 | under refluxing conditions at about 115° C. for 4 hours, and then adding 2.5 parts of paraffin wax (M. P. 60° C.). Coat regenerated cellulose web with this composition in the manner described in Example I. The coating will show no loss in adhesion and heat sealing characteristics after several weeks' exposure at 95° F. (35° C.). It will have a permeability value of 10, a heat sealing value of 200, and be transparent and flexible.

Example III

Prepare a moistureproofing coating composition by dissolving 2.5 parts of paraffin wax (M. P. 60° C.) in a solution prepared by heating:

| | Parts |
|---|---|
| Beta-naphthol-rubber product (purified) | 25.0 |
| Citraconic anhydride | 2.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 150.

Example IV

Prepare a moistureproofing coating composition by dissolving 2.5 parts of paraffin wax (M. P. 60° C.) in a solution prepared by heating:

| | Parts |
|---|---|
| Beta-naphthol-rubber product (purified) | 25.0 |
| Crotonic acid | 3.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 140.

Example V

Prepare a coating composition by heating under refluxing conditions for 5 hours at 110°–115° C. a solution consisting of:

| | Parts |
|---|---|
| Beta-naphthol-rubber product (purified) | 20.0 |
| Maleic anhydride | 1.0 |
| Benzoyl peroxide | 0.2 |
| Toluene | 180.0 |
| Paraffin wax (M. P. 60° C.) | 2.0 |

Coat regenerated cellulose web with this composition in the manner described in Example I. It will have a permeability value of 10, a heat sealing value of 800, and be transparent and flexible. A loss in adhesion and heat sealing properties will be considerably less than that in a product obtained in an identical manner but omitting the heating under reflux, in other words, the reaction between the unsaturated acid material and the beta-naphthol-rubber product gives a product which retains its original characteristics much longer than would a mixture of the unreacted products.

Example VI

Heat a mixture of:

| | Parts |
|---|---|
| Beta-naphthol-rubber product (purified) | 20.0 |
| Maleic anhydride | 2.0 |
| Lauroyl peroxide | 0.4 |
| Toluene | 180.0 |
| Paraffin wax (M. P. 60° C.) | 2.0 | at 110°–115° C. for six hours and coat regenerated cellulose web with the resulting solution in the manner described in Example I. The resulting product will be moistureproof (have a permeability value of 8), and have good heat sealing properties (heat seal value 125). It will show no degradation in heat sealing properties and adhesion after two weeks free exposure at 95° F. (35° C.).

If the heating is omitted, the resulting product will show practically complete loss of heat sealing properties and adhesion to the base sheet in less than one week. As will be apparent from a comparison with the process in which heating is employed, a chemical reaction takes place between the beta-naphthol-rubber product and the maleic anhydride on heating at 110°–115° C.

*Example VII*

Heat a mixture of:

| | Parts |
|---|---|
| Beta-naphthol-rubber product (purified) | 20.0 |
| Maleic anhydride | 2.0 |
| Benzoyl peroxide | 0.1 |
| Toluene | 180.0 |
| Paraffin wax (M. P. 60° C.) | 2.0 | at 110°–120° C. for four hours, and coat regenerated cellulose web with the resulting solution in the manner described in Example I. The resulting product will retain its adhesion and heat sealing properties after four weeks' exposure at 95° F. (35° C.). It will have a permeability value of 7 and a heat seal value of 130.

*Example VIII*

Heat a mixture of:

| | Parts |
|---|---|
| Beta-naphthol-rubber product (purified) | 20.0 |
| Maleic anhydride | 2.0 |
| Toluene | 180.0 |
| Paraffin wax (M. P. 60° C.) | 2.0 | at 110°–120° C. for four hours, and coat regenerated cellulose web with the resulting solution in the manner described in Example I. The resulting product will retain its adhesion and heat sealing properties after three weeks' exposure at 35° C. It will have a permeability value of 25 and a heat seal value of 130.

*Example IX*

Heat a mixture of:

| | Parts |
|---|---|
| Beta-naphthol-rubber product (purified) | 20.0 |
| Maleic anhydride | 2.0 |
| Paratoluene sulfonic acid | 0.4 |
| Toluene | 180.0 |
| Paraffin wax (M. P. 60° C.) | 2.0 | at 110°–120° C. for four hours, and coat regenerated cellulose web with the resulting solution in the manner described in Example I. The resulting product will retain its adhesion and heat sealing properties after three weeks' exposure at 35° C. It will have a permeability value of 70 and a heat seal value of 110.

*Example X*

Heat a mixture of:

| | Parts |
|---|---|
| Beta-naphthol-rubber product (purified) | 20.0 |
| Maleic anhydride | 1.0 |
| Benzoyl peroxide | 0.2 |
| Toluene | 180.0 |
| Paraffin wax (M. P. 60° C.) | 2.0 | at 110°–120° C. for four hours, and coat organic solvent soluble cellulose acetate sheet wrapping material with the resulting solution in the manner described in Example I. The resulting product will retain its adhesion and heat sealing properties after three weeks' exposure at 35° C. It will have a permeability value of 8 and a heat seal value of 145.

*Example XI*

Heat a mixture of:

| | Parts |
|---|---|
| Beta-naphthol-rubber product (purified) | 20.0 |
| Maleic anhydride | 1.0 |
| Benzoyl peroxide | 0.2 |
| Toluene | 180.0 |
| Paraffin wax (M. P. 60° C.) | 2.0 | at 110°–120° C. for five hours, and coat regenerated cellulose film with the resulting solution in the manner described in Example I. The resulting product will retain good adhesion, moistureproofness, anchorage and heat sealing properties after three weeks' exposure at 35° C. It will have a permeability value of 5 and a heat seal value of 160.

*Example XII*

Reflux a solution of:

| | Parts |
|---|---|
| Beta-naphthol-rubber product (purified) | 40.0 |
| Maleic anhydride | 2.0 |
| Benzoyl peroxide | 0.4 |
| Toluene | 200.0 | for five hours at a temperature of 110°–115° C., and isolate the resulting solid product. The isolation may be accomplished in various ways, for example, by evaporating off the solvents under vacuum or by precipitating by pouring the toluene solution into alcohol with stirring, followed by washing with water and drying.

The resulting product, when dissolved in a suitable solvent such as toluene, benzene or naphtha, and coated on regenerated cellulose sheet, will show good adhesion and heat sealing properties, and retain these properties for a considerably longer time than coatings of the same beta-naphthol-rubber product unmodified by treatment with maleic anhydride and similarly coated from a solution.

Similar properties are obtained when the coating is applied to paper, lacquer coated paper, wood, lacquer coated wood, lacquer coated metal, and cellulose acetate. Such coatings will be of the moistureproof type if wax is dissolved in the solution before it is used for coating.

*Example XIII*

Heat a mixture of:

| | Parts |
|---|---|
| Beta-naphthol-rubber product (purified) | 20.0 |
| Maleic anhydride | 1.0 |
| Benzoyl peroxide | 0.2 |
| Toluene | 180.0 |
| Hydrogenated methyl abietate | 2.0 |
| Paraffin wax (M. P. 60° C.) | 2.0 | at 110°–120° C. for four hours, and coat organic solvent soluble cellulose acetate sheet wrapping material with the resulting solution in the manner described in Example I. The resulting product will retain its adhesion and heat sealing properties after three weeks' exposure at 35° C. It will have a permeability value of 8 and a heat seal value of 145.

*Example XIV*

Heat a mixture of:

| | Parts |
|---|---|
| Beta-naphthol-rubber product (purified) | 25.0 |
| Cinnamic acid | 3.0 |
| Benzoyl peroxide | 0.25 |
| Chlorinated paraffin wax (40% chlorine) | 1.0 |
| Toluene | 225.0 | under a reflux condenser at approximately 115° C. for 5 hours and then incorporate in the resultant 2.5 parts of paraffin wax (M. P. 60° C.), and coat regenerated cellulose film with the resulting solution in the manner described in Example I. The resulting product will be moistureproof, heat sealable, transparent, flexible, non-tacky, colorless, and have good slip, a permeability value of 25 and a heat sealing value of 240.

*Example XV*

Prepare a moistureproofing coating composition by dissolving 2.5 parts of paraffin wax (M. P. 60° C.) and 2 parts of ester gum, in a solution prepared by heating:

| | Parts |
|---|---|
| Beta-naphthol-rubber product (purified) | 25.0 |
| Citraconic anhydride | 2.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 150.

*Example XVI*

Prepare a moistureproofing coating composition by dissolving 2.5 parts of paraffin wax (M. P. 60° C.) and 2 parts of coumarone-indene resin in a solution prepared by heating:

| | Parts |
|---|---|
| Beta-naphthol-rubber product (purified) | 25.0 |
| Crotonic acid | 3.0 |
| Benzoyl peroxide | 0.25 |
| Toluene | 225.0 | at 115° C. for 4 hours under a reflux condenser.

Coat regenerated cellulose web with this composition in the manner described in Example I. The coating will show no loss in adhesion and heat sealing characteristics after several weeks' exposure at 95° F. (35° C.). It will be transparent, moistureproof, flexible, and have a permeability value of 10 and a heat seal value of 140.

*Example XVII*

Use a composition consisting of:

| | Parts |
|---|---|
| Beta-naphthol-rubber product (purified)-maleic acid product (of Ex. XII) | 10 |
| Polybutene [1] (molecular wt. 7,000) | 30 |
| Paraffin wax (M. P. 60° C.) | 25 |
| Toluene | 100 |

[1] J. I. E. C. XXXII 299, 731.

to adhere two sheets of plain, transparent, regenerated cellulose film. The laminated product will be transparent and moistureproof.

*Example XVIII*

Use a composition consisting of:

| | Parts |
|---|---|
| Beta-naphthol-rubber product (purified)-maleic acid product (of Ex. XII) | 50 |
| Hydrogenated methyl abietate | 30 |
| Paraffin wax (M. P. 60° C.) | 20 | to adhere two sheets of plain, transparent, regenerated cellulose film. The laminated product will be transparent and moistureproof.

The phenol rubber product-unsaturated carboxylic acid condensation (reaction) product is new. In its preparation, phenol-rubber products from various phenols may be employed. One or more phenols may be used in preparing the phenol-rubber product, and one or more phenol-rubber products may be used in the maleic anhydride type condensation.

The carbonyl compounds condensed with the phenol-rubber products are hydrocarbon carboxylic acids and anhydrides. The carbonyl group may be attached to saturated or unsaturated carbon atoms, that is to say, carbonyl compounds may be aliphatic, alicyclic or aryl. They may be mono- or polybasic. The preferred acids are acrylic, crotonic, methacrylic, cinnamic, maleic and itaconic. The corresponding acid anhydrides, as just indicated, can also be used, for example, maleic anhydride, citraconic anhydride, etc. Compounds decomposing to these acids and their anhydrides as a result of the heating which takes place during the reaction, for example malic acid (yielding maleic acid), citric acid (yielding itaconic acid and citraconic acid anhydride), etc., can also be used, and being equivalents, are considered within the scope of this invention and the terminology used to describe it.

The condensation is preferably carried out in a solvent. Various organic liquids such as aromatic hydrocarbons (benzene, toluene, xylene, etc.), naphtha solvents and chlorinated hydrocarbons, are suitable. In the absence of solvents, suitable mixtures of the ingredients may be employed. The reaction may be carried out under various conditions of temperature and pressure, for example, refluxing at atmospheric pressure with a solvent, or at higher temperatures and pressures in an autoclave. A reaction temperature above 100° C., preferably in the range 100°–110° C., is preferred, but the wider range of 60°–150° C. gives usable products.

The reaction should be complete after 4 hours' heating at 110° C. A product heated for only 2 hours at 100°–110° C. can be used to advantage. Naturally the time of reaction varies with the temperature and the efficiency of the catalyst. Catalysts other than those mentioned in the specific examples, for example, hydrogen peroxide, may be employed, or if the particular circumstances involved do not interfere with a relatively longer reaction period, the condensation may be carried out in the absence of a catalyst.

No advantage has been found in using more than 15% maleic anhydride (or equivalent quantities of other carbonyl compounds) based on the combined weight of the reactants. There are economic disadvantages in using more than this amount, since the additional material does not seem to produce any difference in the final product. A definite improvement results with quantities as low as 0.1% maleic anhydride, so these figures may be taken as the maxima and minima of the preferred range of proportions.

The phenol rubber products (used for the reaction with the unsaturated carbonyl compound) are resinous, transparent, thermoplastic, benzene-soluble derivatives of rubber which are resistant to acids and alkalies, which do not adhere to rubber, which have an impact strength similar to phenol aldehyde resins, which impart a hardness to rubber (when compounded therewith) like glue and Montan wax, and which are obtained by reacting rubber with a monohydric phenol which contains no substituents other than halogen and hydrocarbon radicals. The phenol rubber products can be hydrogenated at temperatures in the range 80°-200° C. in the presence of an acidic catalyst.

The preparation of the phenol rubber product is described in U. S. A. Patent No. 2,158,530 (Williams), and reference is made thereto for details. For convenience it may be pointed out that the amount of the phenolic material (phenol, naphthol, etc.) may vary widely, the ordinary limits being 5% to 55% (based on the rubber). The products prepared by milling 5 to 20 parts of beta-naphthol with 100 parts of rubber in the presence of 4 parts of sulfuric acid as a catalyst, are the preferred starting materials. Although this type of material (using 10 parts of beta-naphthol) was employed in the specific examples, it is to be understood that any one or a plurality of the type of products disclosed by the patent just mentioned may be employed, when desired.

The crude phenol-rubber product (containing excess phenolic material) may be used, but the best results have been obtained when the excess of the phenol was removed. Ordinary extraction procedures utilizing such materials as alcohol solvents, such as ethanol and butanol, are suitable for removing the unreacted phenolic material. The reaction product may also be purified by dissolving in toluene and precipitating the phenol rubber product with ethyl alcohol (which retains the phenolic body in solution). Treatment of the crude reaction product with formaldehyde renders the excess phenolic material innocuous by causing it to form a phenol formaldehyde resin, whose presence in the composition is not ordinarily objectionable (because it does not exude or blush out as the free phenolic compound would).

Various phenols in addition to the hydroxybenzene and beta-naphthol of the examples, for instance, chloro-phenol, cresol and dihydroxy-diphenyl, may be employed in the manufacture of the phenol rubber product, as indicated in the patent just discussed. One or more phenolic materials may be used in the reaction with the rubber. Catalysts other than the sulfuric acid and dihydroxy-fluorboric acid, for example, organic sulfonic acids, hydroxy-fluorboric acid and boron trifluoride, may be employed.

The phenol-rubber products of this invention may be designated by a variety of names other than those already mentioned, for example, "rubber alkylated phenol," "phenol modified rubber," "rubber substituted phenol," and "phenol rubber condensation product." These terms, as used in this application, are intended to apply only to the type of material obtained according to the aforementioned U. S. A. Patent No. 2,158,530. They are not to be construed broadly enough to cover isomers or like derivatives of rubber which might be obtained by using phenol or phenol sulfonic acid in a simple catalytic capacity.

As the moistureproofing agent, any wax (used generically to include waxy (or wax-like) substances like paraffin wax, as well as true waxes which are monohydric alcohol esters of higher fatty acids) or mixture of waxes, may be employed. Ordinarily paraffin wax melting above 50° C., or better, that melting at 60° C. (and above), is preferred.

The incorporation of wax in compositions containing the new phenol-rubber product derivative leads to moisture resistance. Ordinarily 3% to 15% wax, based on the solids of the moistureproofing coating composition, is employed. Noticeable improvement is obtainable with even smaller amounts. The wax may be added either before or after the phenol-rubber product is reacted with the carbonyl compound.

The properties of the new phenol-rubber product derivative compositions may be enhanced and modified in known ways, by the incorporation of minor proportions of other materials. Details of the conventional modifying practices such as dyeing, pigmenting, plasticizing (or softening), transparentizing, and like procedures and materials used therein, are well known and are disclosed in the patents listed elsewhere herein. Reference is made thereto for specific details. Beneficial results are frequently brought about by incorporating natural and/or synthetic resins.

Organic solvent soluble amino polymers (basic amino nitrogen-containing polymers) of the type disclosed in U. S. A. Patent No. 2,190,776 (Ellingboe & Salzberg) may be added to the composition for further or specialized protection. These materials are also soluble in 2% aqueous acetic acid. Anti-oxidants and other stabilizers may be added for the same purpose.

In preparing the coating compositions, any solvent dissolving the phenol-rubber product-unsaturated carbonyl compound condensation product, may be used, although hydrocarbon solvents, particularly aromatics such as benzene, toluene and xylene, are preferred. Mixed solvents such as those containing minor proportions of ketones, esters, or alcohols, may be used. These compositions may be applied as melts at high temperatures, in which case no solvent, or only a minor proportion of solvent, need be present.

The new phenol-rubber product-unsaturated carbonyl compound reaction products are especially useful in coating compositions applied to transparent, smooth, substantially non-porous, non-fibrous sheet, such as those composed of cellulosic material, for example, regenerated cellulose and cellulose acetate, albuminous material, for example, gelatine and casein, and polyvinyl compounds, for example, polyvinyl alcohols and polyvinyl acetals. Water sensitive sheet obtained by coagulation or precipitation and/or regeneration from aqueous (or aqueous alkaline, for example, alkali metal hydroxide and the like) dispersions (or solutions), for example, viscose, cuprammonium and like regenerated cellulose, polyvinyl alcohol, low (lowly) substituted (less than one mol per glucose unit) cellulose ethers (U. S. A. Patent No. 2,123,880 to Ellsworth), such as glycol cellulose, cellulose glycolic acid, alkyl (methyl, ethyl, etc.) cellulose, and the like, are especially satisfactorily coated with the moistureproofing compositions of this invention. As indicated above, the presence of the new phenol-rubber product derivatives also improves coating compositions used on organic solvent soluble compounds like cellulose ethers, for example, ethyl cellulose, and cellulose esters, for example, cellulose acetate. The same is true with paper, modified paper, lowly esterified cellulose, etc. The new compounds can also be used to coat fabrics, to prepare molding materials, to act as cementing (binding) agents in protective coatings for wood, metal, etc., as adhesives, and for numerous other purposes. These derivatives also serve admirably as adhesives in the lamination of sheet material, for example, regenerated cellulose, cellulose derivatives of the same or different kinds, regenerated cellulose to paper, etc., especially when a moistureproof product is desired.

Ordinary moistureproof sheet wrapping material consists of a regenerated cellulose film 0.00088 of an inch thick, with a moistureproofing coating 0.0005 of an inch thick on each side.

The reaction products of phenol-rubber product with unsaturated hydrocarbon acids and their anhydrides may be further reacted with alcohols, either monohydric or polyhydric, to produce softer or firmer plastic material. Optionally, an ester, such as monobutyl maleate, may be reacted directly. These esterified products, like the non-esterified products, are useful for molding purposes, in adhesives, in protective coatings, etc.

By the expression "anchor" or equivalents (anchoring, anchored, etc.) is meant the securing of the surface coating on the base in such a way that the resulting product will withstand the deleterious effects of water (or moisture). Whether a substance is an anchoring agent or not is easily determined, for example, by comparing the time of immersion in water required to loosen a moistureproofing coating containing the substance, with the time required to bring about the same loosening with the coating omitting the substance being tested (but otherwise having the same proportions of ingredients). Compositions of this invention, when tested by immersion in water at 20° C., give a several-fold improvement in the time required to loosen the coating from the water sensitive and non-moistureproof base sheet.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent No. 2,147,180 (Ubben). In the interest of brevity the definitions and test description are not repeated here. The terms and expressions related thereto and employed herein are used in accordance with such definitions and description.

The phenol-rubber product-carbonyl compound derivatives are more stable by far than the phenol-rubber products from which they are made. It is therefore possible to produce moistureproofed products which retain their desirable properties over a much greater period of time than has been thought possible heretofore. This is particularly true with regard to such characteristics as hardness, adhesion of the coating to the base sheet, strength of adhesive bonds obtained by the application of heat and/or pressure, transparency, and general optical characteristics, absence of color, insensibility to water and moisture, lack of tackiness, etc. As a result, the moistureproof sheet wrapping material described above is well adapted to be handled readily upon automatic wrapping machinery, because the individual sheets do not stick to each other or the machine surfaces with which they come in contact, and for the wrapping of wet products such as butter, fish, etc., even when exposed to light, heat, oxygen of the atmosphere, etc.

As many apparently widely different embodiments of this invention may be made without departing from the spirit and scope thereof, it is to be understood that this invention is not limited to the specific embodiments thereof except as defined in the appended claims.

I claim:

1. A condensation product consisting of phenol-rubber product reacted with maleic anhydride, at a temperature of 60°–150° C., said phenol-rubber product being a reaction product of rubber and a phenol containing 1% to 5% of the phenol chemically combined with the rubber.

2. A condensation product consisting of phenol-rubber product reacted with a carbonyl compound from the group consisting of acrylic acid, crotonic acid, methacrylic acid, cinnamic acid, maleic acid, itaconic acid, maleic acid anhydride, citraconic acid anhydride and citric acid, at a temperature of 60°–150° C., said phenol rubber product being a reaction product of rubber and a phenol containing 1% to 5% of the phenol chemically combined with the rubber.

3. Sheet material coated with a condensation product consisting of beta-naphthol rubber product reacted with a carbonyl compound from the group consisting of acrylic acid, crotonic acid, methacrylic acid, cinnamic acid, maleic acid, itaconic acid, maleic acid anhydride, citraconic acid anhydride and citric acid, at a temperature of 60°–150° C., said beta-naphthol rubber product being a reaction product of rubber and a beta-naphthol containing 1% to 5% of the beta-naphthol chemically combined with the rubber.

4. Regenerated cellulose coated with a condensation product consisting of phenol-rubber-condensation-product reacted with a carbonyl compound from the group consisting of acrylic acid, crotonic acid, methacrylic acid, cinnamic acid, maleic acid, itaconic acid, maleic acid anhydride, citraconic acid anhydride and citric acid, at a temperature of 60°–150° C., said phenol-rubber product being a reaction product of rubber and a phenol containing 1% to 5% of the phenol chemically combined with the rubber.

5. A moistureproofing coating composition comprising essentially 3%–15% wax and a condensation product consisting of phenol-rubber product reacted with maleic anhydride, at a temperature of 60°–150° C., said phenol-rubber product being a reaction product of rubber and a phenol containing 1% to 5% of the phenol chemically combined with the rubber.

6. A thin, flexible, sheet material comprising a film of a moistureproof composition, said moistureproof composition comprising essentially 3%–15% wax and cementing material therefor, said cementing material being a condensation product consisting of phenol-rubber product reacted with a carbonyl compound from the group consisting of acrylic acid, crotonic acid, methacrylic acid, cinnamic acid, maleic acid, itaconic acid, maleic acid anhydride, citraconic acid-anhydride and citric acid, at a temperature of 60°–150° C., said phenol-rubber product being a reaction product of rubber and a phenol containing 1% to 5% of the phenol chemically combined with the rubber.

7. The process which comprises reacting the reaction product of rubber and a phenol containing 1% to 5% of the phenol chemically combined with the rubber, and a carbonyl compound from the group consisting of acrylic acid, crotonic acid, methacrylic acid, cinnamic acid, maleic acid, itaconic acid, maleic acid anhydride, and citric acid, at a temperature of 60° to 150° C.

8. The process which comprises reacting the reaction product of rubber and a phenol containing 1% to 5% of the phenol chemically combined with the rubber, and a carbonyl compound from the group consisting of acrylic acid, crotonic acid, methacrylic acid, cinnamic acid, maleic acid, itaconic acid, maleic acid anhydride, citraconic acid anhydride, and citric acid, at a temperature of 100° to 110° C.

9. The process which comprises reacting the reaction product of rubber and a phenol containing 1% to 5% of the phenol chemically combined with the rubber, and from about 0.1% to about 15% by weight of maleic anhydride at a temperature of 60° to 150° C.

10. The process which comprises reacting the reaction product of rubber and a phenol containing 1% to 5% of the phenol chemically combined with the rubber, and from about 0.1% to about 15% by weight of maleic anhydride at a temperature of 100° to 110° C.

JAMES A. MITCHELL.